(12) United States Patent
Green et al.

(10) Patent No.: US 11,622,283 B2
(45) Date of Patent: *Apr. 4, 2023

(54) WIRELESS COMMUNICATION SYSTEM WITH DISCRIMINATION BETWEEN EXTRANEOUS RECEIVED SIGNALS

(71) Applicant: Ocado Innovation Limited, Hatfield (GB)

(72) Inventors: Adam Nikolai Green, Hatfield (GB); Fraser Murray Edwards, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,168

(22) Filed: Oct. 5, 2021

(65) Prior Publication Data

US 2022/0030437 A1 Jan. 27, 2022

Related U.S. Application Data

(63) Continuation of application No. 16/498,045, filed as application No. PCT/EP2018/056859 on Mar. 19, 2018, now Pat. No. 11,166,168.

(30) Foreign Application Priority Data

Mar. 27, 2017 (GB) ...................................... 1704826

(51) Int. Cl.
*H04W 16/14* (2009.01)
*H04W 72/04* (2009.01)
(Continued)

(52) U.S. Cl.
CPC ....... *H04W 16/14* (2013.01); *H04W 72/0446* (2013.01); *H04W 74/0808* (2013.01)

(58) Field of Classification Search
None
See application file for complete search history.

(56) References Cited

U.S. PATENT DOCUMENTS 6,418,317 B1 7/2002 Cuffaro et al.
9,225,946 B2 12/2015 Lim et al.
(Continued)

FOREIGN PATENT DOCUMENTS

CN 101390328 A 3/2009
CN 102484878 A 5/2012
(Continued)

OTHER PUBLICATIONS

ETSI, "Broadband Radio Access Networks (BRAN); 5 GHz high performance RLAN; Harmonized EN covering the essential requirements of article 3.2 of the R& TTE Directive", ETSI EN 301 893 V1 .7.1, Jun. 2012, pp. 1-90, retrieved from the Internet.
(Continued)

*Primary Examiner* — Hong Shao
(74) *Attorney, Agent, or Firm* — Buchanan Ingersoll & Rooney PC

(57) ABSTRACT

A wireless communication system having base stations and remotely located terminal units. The base stations and the remotely located terminal units communicate data over operational wireless communication links assigned to respective sub-channels having tiles separated by frequency and time. Detectors for analyzing extraneous received signals in unassigned tiles of the communication links discriminate between a first type of extraneous signals detected in unassigned tiles of one sub-frame and also detected in other unassigned tiles, and a second type of extraneous signals detected in the unassigned tiles but not detected in other unassigned tiles. The reaction of the base stations is different based on the type of extraneous signals.

33 Claims, 6 Drawing Sheets

(51) Int. Cl.
*H04W 74/08* (2009.01)
*H04W 72/0446* (2023.01)

(56) References Cited

U.S. PATENT DOCUMENTS

| 9,594,153 | B1 | 3/2017 | Oroskar et al. |
| 2005/0043047 | A1 | 2/2005 | Vigier et al. |
| 2005/0054294 | A1 | 3/2005 | Khun-jush et al. |
| 2013/0044725 | A1 | 2/2013 | Chun et al. |
| 2014/0119671 | A1 | 5/2014 | Lim et al. |
| 2014/0220964 | A1 | 8/2014 | Kurucz et al. |
| 2015/0003272 | A1 | 1/2015 | Hu et al. |
| 2015/0063321 | A1 | 3/2015 | Sadek et al. |
| 2015/0296413 | A1 | 10/2015 | Sadek et al. |
| 2015/0350945 | A1 | 12/2015 | Chae et al. |
| 2019/0319666 | A1 | 10/2019 | Alriksson et al. |

FOREIGN PATENT DOCUMENTS

| CN | 103650501 A | 3/2014 |
| CN | 104081848 A | 10/2014 |
| CN | 104937861 A | 9/2015 |
| EP | 1443706 A1 | 8/2004 |
| GB | 2529029 A | 2/2016 |
| JP | 2005505216 A | 2/2005 |
| WO | 03001742 A1 | 1/2003 |
| WO | 03026218 A1 | 3/2003 |
| WO | 2011000110 A2 | 1/2011 |
| WO | 2013108009 A1 | 7/2013 |

OTHER PUBLICATIONS

Hossein-Ali et al., "Spectrum Sharing of Radar and Wi-Fi Networks: The Sensing/Throughput Tradeoff", IEEE Transactions on Cognitive Communications and Networking, Dec. 2015, pp. 372-382.

International Search Report (PCT/ISA/210) and Written Opinion (PCT/ISA/237) dated Jun. 1, 2018, by the European Patent Office as the International Searching Authority for International Application No. PCT/EP2018/056859.

Notification of Grant dated Aug. 20, 2019, by the British Patent Office for Application No. 1804345.5.

Search and Examination Report dated Sep. 19, 2018, by the British Patent Office for Application No. 1804345.5.

First Office Action dated Jul. 13, 2021, by the Japanese Patent Office in corresponding Japanese Patent Application No. 2019-553469, and an English translation of the Office Action. (5 pages).

Office Action dated Sep. 20, 2022, by the Chinese Patent Office in corresponding Chinese Patent Application No. 201880034867.5. (6 pages).

WIRELESS COMMUNICATION SYSTEM WITH DISCRIMINATION BETWEEN EXTRANEOUS RECEIVED SIGNALS

FIELD OF THE INVENTION

This invention relates to a wireless communication system with discrimination between different types of extraneous received signals.

Wireless communication refers to communication of data using modulated electromagnetic radiation through a non-solid medium. The term does not imply that the associated devices do not contain any wires. Wireless communications may be utilized in conjunction with wired communications.

BACKGROUND OF THE INVENTION

Various techniques to allocate spectrum usage, in various dimensions such as time and frequency, and the ability to combine signals by multiplexing and to separate multiplexed signals, may be employed to use limited spectrum bandwidth more efficiently, with a protocol for sharing, allocating and reusing the spectrum bandwidth.

These protocols may also be designed with consideration for a number of environmental factors, for example issues with spectral noise, interference, signal degradation, wave absorption, blocking and reflection, multipath fading, and limited availability of spectrum.

Typically a radio (wireless) local area network (RLAN) has one or more base stations (or access points), a plurality of remotely located terminal units (or user equipment) transmitting and receiving data over operational wireless communication links, and may have a base station controller that controls channel parameters used by the base stations for the respective communication links. The term base station is used herein to refer to a wireless communications station installed usually at a fixed location and used for wireless communication with terminal units, which may be mobile. The base stations may communicate also over wired or wireless communication links with other base stations and one or more base station controllers. The terminal units may also communicate directly with each other in some configurations without the communication passing through a base station or a base station controller.

Patent Specification GB2529029 (Ocado Innovation Limited) describes use of RLANs in various applications. One such application is in an automatic or semi-automatic warehouse facility with robots including RLAN communication terminal units. Movements of the robots may be enabled across various paths, some of which may intersect. The warehouse facility may include bins arranged for example in a grid-like structure, where robots move to place objects in and pick objects from the bins. The RLAN may also include other mobile, non-robot terminal units, for example communication terminal units carried by human beings. The facility includes a robot control system with real-time or near real-time wireless communication between the robot control system, the base stations and the terminal units. The robot control system controls the navigation and routing of robots, including, but not limited to, displacement from one location to another, collision avoidance, optimization of movement paths, and the control of activities to be performed. The base station controller controls parameters of the communication links, rather than the content of the communications.

Many other applications of the RLANs are described in Patent Specification GB2529029, for example the terminal units collecting data including operational data, performance data, analytic metrics related to operations of the system, storing and transmitting metrics regarding route planning or obstacles on a map, such intelligence being processed at a base station, or a central server, and decisions distributed to the terminals on the network. Information gathered may be utilized to map various properties of terminals over a period of time.

There are various communication technologies and protocols available, such as the IEEE 802.11/W-Fi™ standards, and wireless cellular communications (2G, 3G, Universal Mobile Telecommunications System (UMTS), Long-Term Evolution (LTE), for example. A challenge common to the different technologies of wireless networks when providing effective and consistent communication is limited spectrum bandwidth. Spectrum is limited both by natural constraints such as interference by transmissions from neighbouring devices or by noise and also by legal/regulatory requirements. For example certain bands of frequency are highly regulated and are allocated to, or prioritise particular uses. An example of such restrictions apply in the frequency range of 5470-5725 MHz that permit unlicensed transmissions but require detection and avoidance of interference with radar signals. Further, these RLANs may use frequency bands that are also used by other types of devices for communications or other uses causing external traffic and noise interference, exacerbated by undesirable signal characteristics such as attenuation when penetrating walls or other solids, lack of bandwidth, low bit rate, antenna size, transmission power, and beam density.

In order to improve functioning, and in certain frequency ranges to ensure compliance with regulatory requirements, RLANs can use techniques of changing the channel parameters, especially the frequencies used for the communication links. For this purpose, the RLAN system may include detectors for detecting extraneous received signals such as interference by signals transmitted by devices outside the system or by noise, or by signals (such as radar) to which compliance with the regulations requires reaction. The reaction of the system to detection of extraneous received signals in a channel may be to cease transmission in that channel and resume transmission after the interference ceases or after changing the channel parameters including the frequencies to avoid the interference. One conventional technique of detection of extraneous received signals and changing the channel parameters including the frequencies is referred to as dynamic frequency selection (DFS). A DFS reaction may cause complications if communication of the system is interrupted or the interference of the receptions continues while the channel parameters are changed, since the time delay may be prohibitive especially if the procedure for checking and implementing the target channel parameters is prolonged. Alternative reactions of the system to detection of extraneous received signals may be justified if the interference is caused by signals transmitted by devices outside the system or by noise, but may be unacceptable if the interference is caused by different types of signals (such as radar), for example.

A wireless communication system that discriminates between different types of extraneous received signals enabling prompt reaction to detection of extraneous received signals with minimal disturbance to communication links is desirable. However, the different types of extraneous received signals encountered may have such similarity of characteristics, and each type may have such variability of characteristics, that conventional detectors are not able to discriminate between the different types sufficiently accurately and reliably. A detector capable of better discriminating between different types of extraneous received signals is desirable.

Some embodiments of the present invention provide a wireless communication system comprising at least one base station and a plurality of remotely located terminal units. The base station and the remotely located terminal units comprise respective communication modules for transmitting and receiving data over operational wireless communication links between at least the base station and the terminal units. The communication links are assigned to respective sub-channels comprising tiles separated by frequency and time. The base station and/or at least one terminal unit includes at least one detector analysing signals from the communication modules for detecting extraneous received signals. The detector analyses signals from the communication modules in unassigned tiles of the communication links. The detector discriminates between a first type of extraneous signals detected in an unassigned tile or group of unassigned tiles of one sub-frame and also detected in other unassigned tiles or groups of unassigned tiles, and a second type of extraneous signals detected in the unassigned tile or group of unassigned tiles of one sub-frame but not detected in other unassigned tiles or groups of unassigned tiles. The reaction of the base station to detection of the first type of extraneous signals is different from the reaction of the base station to detection of the second type of extraneous signals. Examples of extraneous received signals include noise, interference from adjacent communication devices, or non-communication signals such as radar that require reaction as well as causing interference.

The invention also includes a base station for use in such a wireless communication system, and a method of wireless communication.

The detector or detectors will discriminate statistically between signals (of the second type) that are transmitted in bursts shorter than the period of the sub-frames and signals (of the first type) whose transmission is more continuous. The detector may detect reception of radar signals as the second type of extraneous received signals, in which case the reaction of the system to detection of the second type of extraneous received signals can be appropriate for the constraints, even regulations, governing frequencies that are used by radar. To reduce the risk of erroneous detection, the detector may analyse extraneous signals received in more than one unassigned tile or group of unassigned tiles of the same sub-frame, and/or in the same group of unassigned tiles of more than one sub-frame.

The reaction of the base station to detection of the first type of extraneous signals may be to avoid or cease transmitting on that sub-channel unless the extraneous signals are no longer detected. The reaction of the base station to detection of the first type of extraneous signals may use Adaptivity techniques for the operational communication links.

The reaction of the base station to detection of the second type of extraneous signals may be to change channel parameters for the operational communication links. The reaction of the base station to detection of the second type of extraneous signals may use dynamic frequency selection techniques (DFS) to change channel parameters for the operational communication links.

The operational communication links may be separated into receive and transmission sub-frames comprising successive time slots, and the detector may analyse signals from the communication modules in a group of unassigned tiles of the first time slot of the sub-frames, and reception of the first type of extraneous received signals may be detected if the detector detects reception of extraneous signals in the same group of unassigned tiles of subsequent similar sub-frames and/or in other unassigned tiles.

Reception of the second type of extraneous received signals may be detected if the detectors detect reception of extraneous signals in one or some of the unassigned tiles but not detected in other unassigned tiles of the same sub-frame.

The detector may discriminate between the first type of extraneous signals detected in the unassigned tile or group of unassigned tiles of one sub-frame and also detected in the same unassigned tile or group of unassigned tiles of another sub-frame, and the second type of extraneous signals detected in unassigned tiles of one sub-frame but not detected in unassigned tiles of the other sub-frame.

In other embodiments of the invention, reception of the second type of extraneous received signals may be detected if the detector detects reception of extraneous signals in one or some of the unassigned tiles of one sub-frame and in other unassigned tiles of the same sub-frame, but not in unassigned tiles of a subsequent sub-frame.

The base station as master unit may control the channel parameters for the communication links with linked terminal units as slave units.

These and other aspects of the invention will be apparent from the following description of embodiments thereof. In this respect, it is to be understood that the invention is not limited in its application to the details of construction, to the arrangements of the components and to the functioning set forth in the following description or illustrated in the drawings. The invention is capable of other embodiments and of being practised and carried out in various ways. Also, it is to be understood that the phraseology and terminology employed herein are for the purpose of description and should not be regarded as limiting.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
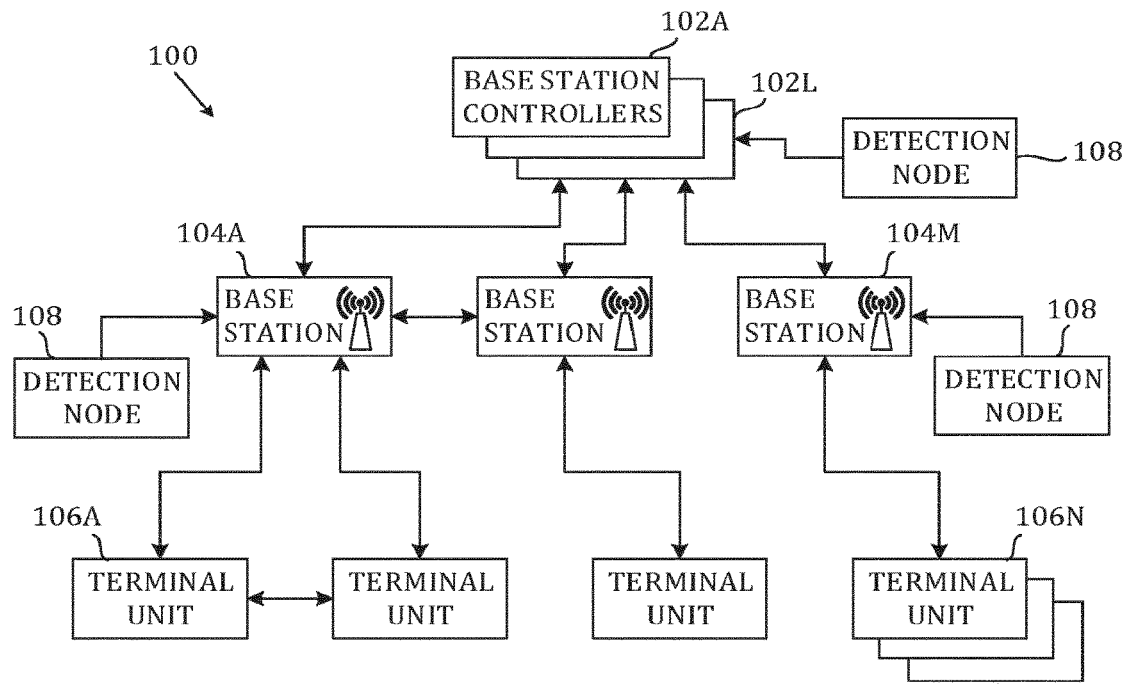
FIG. 1 is a schematic block diagram of elements in a wireless communication system in accordance with an embodiment of the invention, given by way of example.

FIG. 1 of the drawings illustrates a communication system 100 that may be configured to provide communications between one or more base station controllers 102A to 102L, one or more base stations 104A to 104M and/or one or more network connected devices or terminal units 106A to 106N.

The base station controllers 102A to 102L may be implemented for example as a network manager for managing communications in a network environment.

The elements that may be transmitting or receiving data may generically be referred to as devices, which would include at least the terminal units 106A to 106N, base stations 104A to 104M and the base station controllers 102A to 102L but may also be other elements capable of transmitting or receiving data. Some embodiments of the invention include detection nodes 108, described below.

The communication system 100 may be operable such that terminal units 106A to 106N are able to communicate with one another in addition to communicating with one or more centralized systems, including the base stations 104A to 104M and/or the base station controllers 102A to 102L, and/or one or more network managers. The system 100 may be operable to provide communications in a point-to-point arrangement, a point-to-multipoint arrangement, and/or a multipoint-to-multipoint arrangement.

As indicated in FIG. 1, the communication links in the system 100 are not necessarily established in a hierarchical fashion. Communication links may be formed also between devices that perform similar functions, such as between terminal units 106A to 106N, base stations 104A to 104M or base station controllers 102A to 102L. Certain communication links may be implemented using various wired technologies, in addition to links implemented using wireless communication technologies.

The wireless links in the system 100 may operate through a variety of transmission media. The wireless links may communicate using, for example, electromagnetic waves (radio waves, microwaves, infrared, light, laser, lidar, terahertz radiation), sound, or any transmission medium that may be utilized for wireless communications. The system may further be operable in more than one transmission media.

The communication system 100 may be configured to enable communications by provisioning and allocating one or more communication links for communications by the devices. The communication system 100 may also be configured to utilize various technologies and/or arrangements to use the limited spectrum bandwidth more efficiently. Each link may be provisioned based on various factors, such as using various frequency ranges, time slots and tiles. Each of these links may have the same or different characteristics, such as bandwidth, latency, traffic congestion or modulation scheme.

Frequencies used by various communication links may or may not be adjacent to one another, depending on the particular embodiment and configuration. The frequency ranges may be selected and the system 100 may operate such that the system operates within various standards and may co-exist with other users of communications frequencies, such as television broadcasters, mobile telephones and radar. These standards may vary from jurisdiction to jurisdiction. There may be regulatory requirements to co-exist "politely" with other users of spectrum.

The communication links may be used for transmitting or receiving information data and control data, and one or more communication links may also be utilized for emergency, monitoring or diagnostic purposes. The wireless communication system 100 may be configured to adapt to interference or other issues by, for example, stopping transmission on channels where interference is encountered, changing communication channels for communications, resizing communication links, applying filters, employing error checking, employing spatial/frequency techniques and in particular by changing channel parameters including frequencies in response to detection of extraneous received signals. The wireless communication system 100 is described herein with frequent reference to radar signals as extraneous received signals but it will be appreciated that the system 100 can also be used to detect and adapt to other extraneous received signals. References to interference or extraneous received signals include signals transmitted by other devices in the same or similar communication system that are not intended to be received by the receiving element as well as signals transmitted by other types of communication systems or different types of wireless systems, such as radar, or general industrial or household devices.

The communication links may be allocated, repurposed and/or re-sized and the system 100 may benefit from increased flexibility in ease of use and deployment, and when scaling up/down existing deployments. The capacity of the system may be altered by altering tile characteristics, such as pilots, forward error correction, for various reasons, such as taking into consideration the characteristics (physical and spectral) of the environment. The system may be designed for indoor and/or outdoor use.

Figure 2:
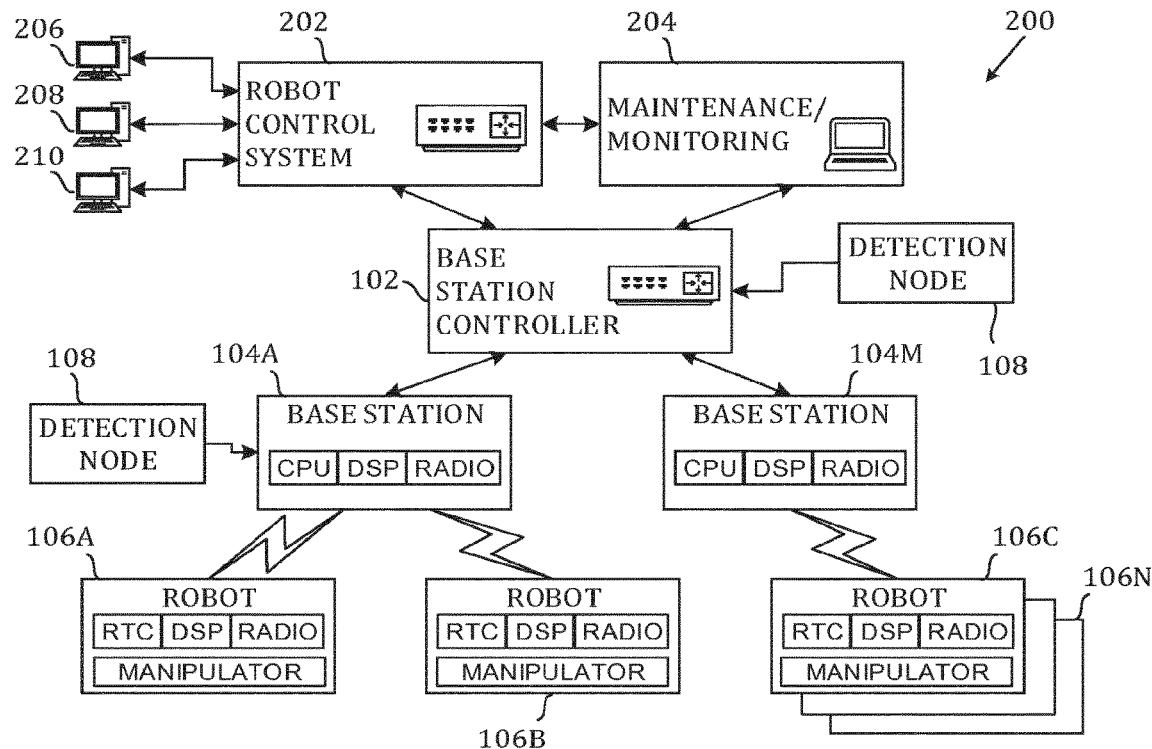
FIG. 2 is a schematic block diagram of an example of a warehouse management system including the wireless communication system of FIG. 1.

FIG. 2 illustrates an example of application of the wireless communication system 100 to a warehouse facility 200 with one or more robots including the terminal units 106A to 106N for placing objects in and picking objects from the bins. Movements of the robots may be enabled across various paths, some of which may intersect. For example the warehouse facility 200 may include bins arranged for example in a grid-like structure, where the robots move within the warehouse facility to perform various tasks. Other non-robot devices may also be terminal units, for example, a human could carry around a terminal unit for communication. Additional detection nodes 108 may provide reports relating to detection of extraneous received signals to base stations 104A to 104M, as shown in FIG. 2, or to the base station controllers 102A to 102L, over suitable wired or wireless links.

The communication system in the warehouse facility 200 may be configured to provide a bandwidth efficient radio control system for robots and terminal units that operate on an X, Y grid of approximate 60×120 meters, for example, although it will be appreciated that the system is applicable in bigger, or smaller grids. Each grid can have many hundreds of robots and there can be several grids in a warehouse. In one example, the system is configured using base stations 104A to 104M providing point to multipoint communications using Time Division Duplex (TDD) to separate the uplink and downlink and Time Division Multiplex (TDM) and Frequency Division Multiplex (FDM) to subdivide the time frequency space to allow for a number of narrow bandwidth connections between the base stations and the terminals/robots.

The transmitters of the base stations may use additional puncturing in the transmit (Tx) sub frame (erasing of Tx bits to enable listening) for detection of radar signals, noise or interference from other sources, in listening for and detecting energy in inactive tiles in the Tx sub-frame.

The warehouse facility 200 may include a robot control system 202, a maintenance/monitoring system 204, one or more warehouse management systems (WMS) 206, order management systems 206 and one or more information management systems 208. The wireless communication links of the warehouse facility 200 may be based on broadband Wi-Fi, which enables real-time or near real-time wireless communication between the base stations 104A to 104M and the terminal units 106A to 106N of the robots.

The warehouse management system 206 may contain information such as items required for an order, stock keeping units in the warehouse, expected and predicted orders, items missing on orders, when an order is to be loaded on a transporter, expiry dates on items, what items are in which container, and whether items are fragile or big and bulky, for example.

The robot control system 202 may be configured to control the navigation/routing of robots, including moving from one location to another, collision avoidance, optimization of movement paths and control of activities to be performed, for example. The robot control system 202 may be configured to send control messages to robots, receive one or more updates from robots, and otherwise communicate with robots using a real or near-real time protocol through their terminal units 106A to 106N, the base stations 104A to 104M and the base station controllers 102A to 102L. The robot control system 202 may receive information indicating robot location and availability from the base station controller 102.

The maintenance and monitoring system (MMS) 204 may be configured to provide monitoring functions, including receiving alerts from the robots/terminal units 106A to 106N and the base stations 104A to 104M and establishing connections to query the robots. The MMS 204 may also provide an interface for the configuration of monitoring functions. The MMS 204 may interact with the Robot Control System 202 to indicate when certain robots should be recalled, or determine when an issue with the system has arisen, such as many clearances having been withdrawn, many paths having failed to resolve, or a number of idle robots beyond a predetermined number.

The robots/terminal units 106A to 106N may include respective real-time controllers (RTC), digital signal processors (DSP) and radio modules, as well as one or more manipulators for handling objects. The base stations 104A to 104M may include respective central processor units (CPU), DSP and radio modules.

The base station controllers 102A to 102L may store master routing information to map the robots, the base stations, and the grids, and are configured to manage dynamic frequency selection and frequency allocation of the base stations 104A to 104M. Dynamic frequency selection (DFS), in some embodiments, may be handled by specific detection nodes 108, described in more detail below, which monitor channels for detecting extraneous received signals, and may be part of a dedicated DFS radio frequency chain. The base stations 104A to 104M, specific receiver elements such as the detection nodes 108, and the robots/terminal units 106A to 106N may react to the detection of extraneous signals with or without coordination by the base station controllers 102A to 102L.

The base stations 104A to 104M may be organized as a pool of base stations, which may then be configured to be active, on standby or to monitor the system. Base stations on standby may act as detection nodes 108. Messages may be routed through the communication system 100 to and from the robots/terminal units 106A to 106N, such as those falling under IEEE wireless standard 802.11, and through fixed links with wired communication, for example Ethernet, to and from the base station controllers 102A to 102L and from any detection nodes 108. The base stations 104A to 104M can each send a brief control signal to the robots/terminal units 106A to 106N linked to that base station to cease transmission prior to the base station ceasing its own transmission, to change the operating frequency, as instructed by the base station controllers 102A to 102L or independently, and inform the robots/terminal units 106A to 106N of a frequency or other channel change using a broadcast communication link. The robots/terminal units 106A to 106N may monitor the signals received for extraneous signals during its downlink sub-frames, signalling the presence of interference to the linked base station and thus to the system during control time slots of the transmission, and may subsequently react to the interference, in coordination with or independently of the base stations 104A to 104M and of the base station controllers 102A to 102L by ceasing or avoiding transmission.

Figure 3:
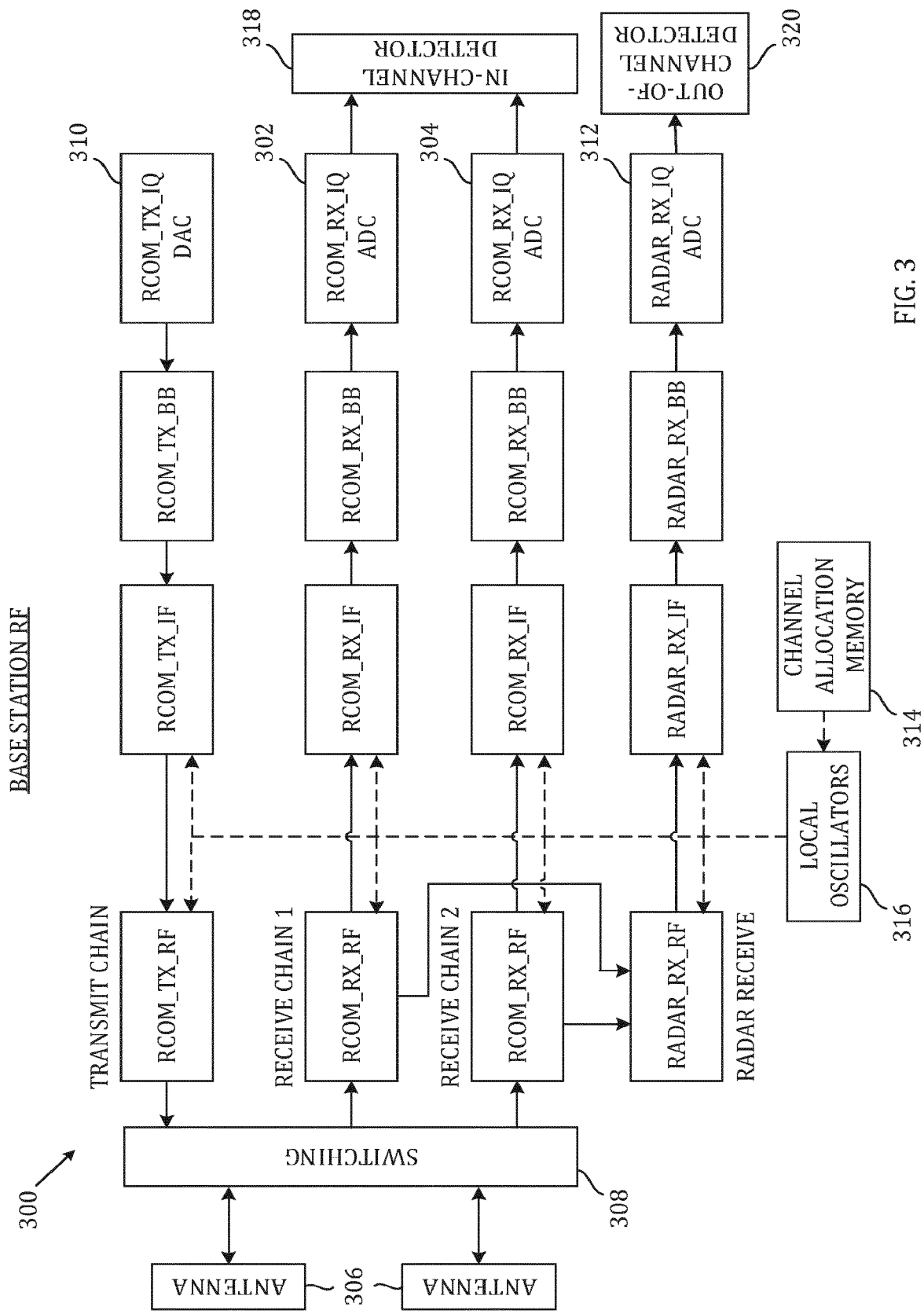
FIG. 3 is a schematic block diagram of an example of a base station in the wireless communication system of FIG. 1.

FIG. 3 illustrates an example of a base station 300 in the wireless communication system 100, which may have several similar base stations. The wireless communication system 100 and base station 300 are also described in our co-pending UK patent application number 1700286.6 filed 8 Jan. 2017 in the name of Ocado Innovation Limited. The system illustrated is a point to multipoint communications system operating in the unlicensed 5470 to 5725 MHz frequency band, but it will be appreciated that other frequency bands may be used and that a system can use two or more non-adjacent frequency bands. The base station 300 uses a 10 MHz bandwidth communication link allocation and may be configured to connect using a time division duplex (TDD) and/or a time division multiple access (TDMA) technique to a number of terminal units in a real or near real time manner.

The base station 300 has a communication module for transmitting and receiving data. The communication module comprises two in-channel receiver chains 302 and 304 operating in parallel for receiving data signals over the operational communication links from antennae 306 and a switching module 308, a transmitter chain 310 and an out-of-channel receiver chain 312 for monitoring signals received in channels different from the channels used by the receiver chains 302 and 304. A base station may comprise only a single in-channel receiver chain respectively, but the use of two in-channel receiver chains 302 and 304 in the base station, as shown, reduces the statistical risk of the antennas for both RF chains being both located in a local null caused by destructive interference in the multipath environment of a warehouse. In this example, the receiver chains 302, 304 and 312 are dual conversion super heterodyne receiver elements having a front end amplifier and filter with a RF frequency of 5470 to 5725 MHz, a first down conversion to IF frequency and a final down conversion to in-phase and quadrature (IQ) baseband. The transmitter chain 310 has similar up conversion elements for generating the transmitter signal. The communication module of the base station 300 includes a channel allocation memory 314 that stores parameters defining the channels used by the different chains of the communication module, as well as target channel parameters for alternative channels allocated by the base station controller 102, enabling a rapid change of channel in the case of detection of an extraneous received signal in the operating channel, or of a change of operational channel allocation. The channel allocation memory 314 pilots local oscillators 316 supplying the down conversion and up conversion frequencies.

The communication module of the base station 300 includes an in-channel detector 318 that analyses signals from the receiver chains 302 and 304 received over operational communication links for detecting extraneous received signals. An out-of-channel detector 320 analyses baseband signals received by the out-of-channel receiver chain 312 in channels different from the operating channels used by the receiver chains 302 and 304 for detecting extraneous received signals. In this example the detectors 318 and 320 are used for detecting radar signals and ensuring compliance with the regulations by dynamic frequency selection (DFS), and changing the channel parameters including the frequencies to avoid the interference with the radar transmissions. The out-of-channel detector 320 performs channel availability check (CAC) procedures on the possibly available alternative channels. The detectors 318 and 320 are also used for detecting extraneous received signals other than radar signals, for example to detect interference by noise, or by communication signals from adjacent devices and avoid the interference with the reception of the wireless communication system 100 and may perform clear channel assessment procedures on the operating and possibly available alternative channels. The detectors 318 and 320 send signals to the base station controller 102 forming reports of detection of extraneous received signals. The reports may also include reports of channels that have successfully passed the channel availability check and clear channel assessment procedures. Channel availability check and clear channel assessment procedures are specified in certain standards and it will be appreciated that embodiments of the invention may use procedures specified in the standards, and future evolutions of the standards, and may use other procedures that are not required by the standards.

The base station 300 as master unit controls the channel parameters for the communication links with linked terminal units as slave units. The terminal units 106A to 106N may have receiver chains, transmitter chains, antennae and switching elements similar to the corresponding elements of the base station 300, the channel parameters used by the terminal units being set by the linked base station 300. The terminal units 106A to 106N may also detect extraneous received signals and may also have an out-of-channel receiver chain, an in-channel detector that analyses signals from the operational receiver chains and an out-of-channel detector that analyses signals received in other channels different from the operating channels for detecting extraneous received signals. Detection of extraneous received signals by the terminal units 106A to 106N is reported to the linked base station 300 and may be reported to the base station controller 102 through the linked base station 300.

Figure 4:
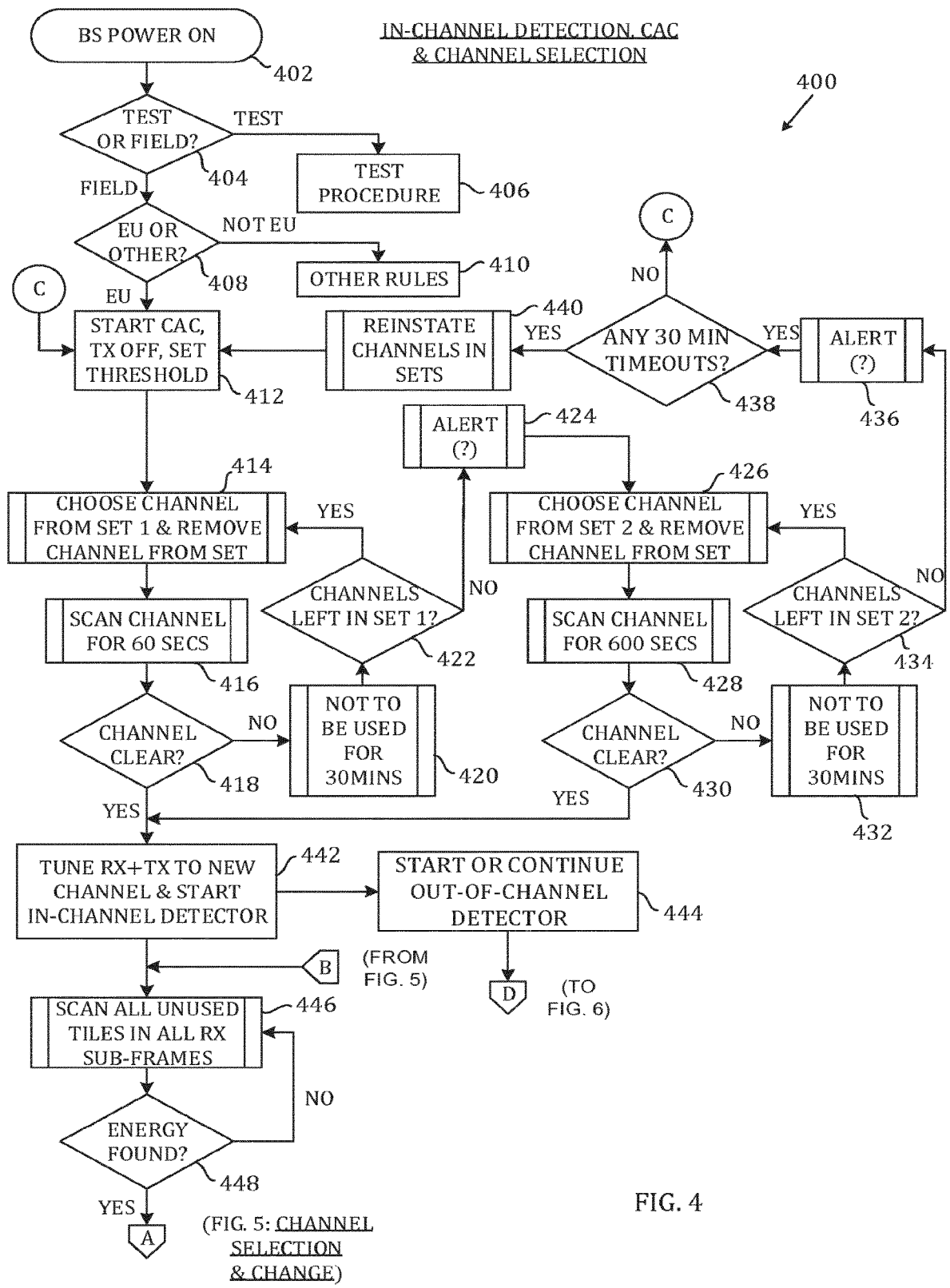
FIG. 4 is a flow chart of an example of a process of starting wireless communication, in-channel detection of extraneous received signals and radar regulation compliant channel selection in the base station of FIG. 3.
Figure 5:
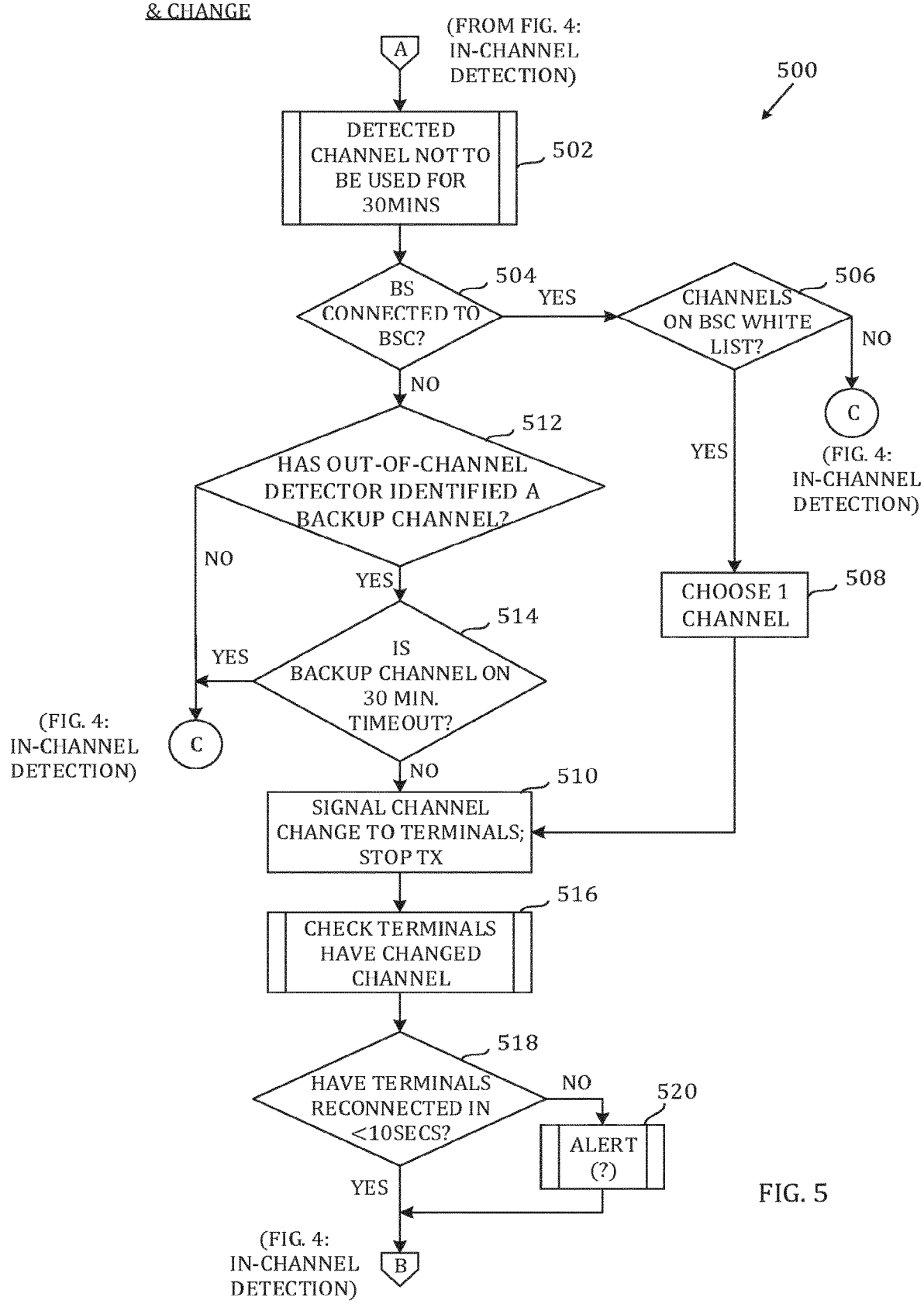
FIG. 5 is a flow chart of an example of a radar regulation compliant process of selecting and changing channel in the event of detection of extraneous received signals in the base station of FIG. 3.
Figure 6:
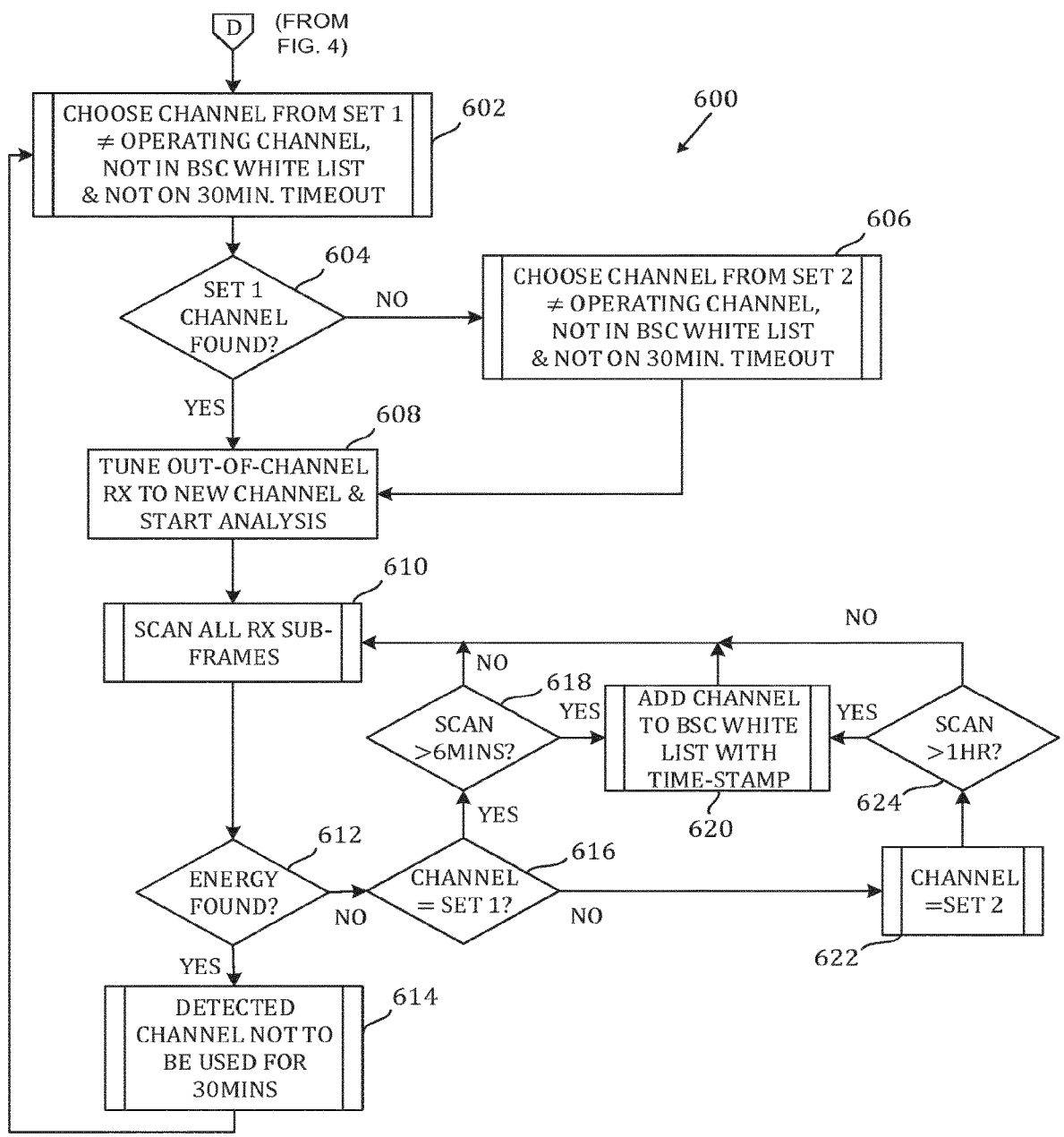
FIG. 6 is a flow chart of an example of a process of out-of-channel detection of extraneous received signals and channel availability check in the base station of FIG. 3.

FIGS. 4 to 6 illustrate, by way of example, a process ensuring compliance with regulations governing avoidance of radar signals by dynamic frequency selection (DFS) in the wireless communication system 100. FIG. 4 illustrates an example of a procedure 400 of in-channel detection of radar signals, FIG. 5 illustrates an example of a radar avoidance procedure 500 of changing the channel parameters including the frequencies used to avoid the interference with the radar transmissions, and FIG. 6 illustrates an example of a procedure 600 of out-of-channel detection of radar signals. In the European Union (EU), relevant regulations from the European Telecommunications Standard Institute (ETSI) are set out in the documents EN301893, "Broadband Radio Access Networks (BRAN); 5 GHz high performance RLAN; Harmonized EN covering the essential requirements of article 3.2 of the R&TTE Directive", and EN3004401, "Electromagnetic compatibility and Radio spectrum Matters (ERM); Short range devices; Radio equipment to be used in the 1 GHz to 40 GHz frequency range; Part 1: Technical characteristics and test methods". In USA, relevant regulations are set out in the document of the Federal Communications Commission (FCC) "CFR47, Part 15, sections C and E". These documents set out regulatory requirements for both normal operation and use, referred to as field operation, and for testing in specified configurations and conditions, referred to as test operation. The operation of the wireless communication system is described below with reference to field operation, the test operation being similar, apart from differences caused by the specified test configurations and conditions. The regulations define channel numbers (n=5482.5+n*10) MHz, where n is an integer from 0 to 23. The channels are divided into two sets: sett is channel numbers 0 to 11 and 18 to 23 and set2 is channel numbers 12 to 17. The operational requirements for set2 are more stringent than for set1.

In this example, the reactions of the system 100 and the base stations 104A to 104M and 300 are compliant with the ETSI and FCC DFS regulatory requirements. The reactions to radar signals of the terminal units 106A to 106N, as slave units, are under the control of the base stations 104A to 104M and 300, and the terminal units 106A to 106N are not required to react autonomously to radar signals. The DFS reaction of the terminal units 106A to 106N is obtained by control signals from the linked base stations 104A to 104M and 300, or by their default absence of data transmission in the absence of the control signals.

The reactions of the system 100 and both the base stations 104A to 104M and 300 and the terminal units 106A to 106N to extraneous received signals other than radar are the subject of regulations in Europe but not in USA. Relevant test procedures from ETSI are set out in the document EN 300 440-1 V1.5.1 (2009-03) "Electromagnetic compatibility and Radio spectrum Matters (ERM); Short range devices". The reactions of both the base stations 104A to 104M and 300 and the terminal units 106A to 106N in this example of the system 100 to extraneous received signals other than radar may be Listen Before Talk (LBT), Detect And Avoid (DAA) and Adaptive Frequency Agility (AFA, also known as Adaptivity). LBT can be used to share spectrum between SRD transceiver equipment with similar power and bandwidth. DAA can be used to protect radio communication services. AFA can be used to avoid co-channel operation with other systems after detection of interference from these other systems, and to provide a more uniform aggregate loading of the spectrum across all devices. The Adaptivity reaction of the terminal units 106A to 106N may be autonomous to their own detection of extraneous signals, or in response to control signals from the linked base stations.

Under EU DFS regulations, on power up a base station (BS) must check a potential channel by the channel availability check (CAC) procedure for 60 seconds minimum if the channel is in set1 and 600 seconds if the channel is in set2. Set1 channels are to be checked first. If radar is not detected in the channel, this channel becomes the operating channel and the in-channel detector 318 continues to monitor continuously for radar detection. If radar is detected on the operating channel the wireless communication system 100 is to switch channel, if one is available. If none is available then transmission in that channel is to cease within a specified maximum time and another channel is to be checked using CAC. Any channels that are found to have radar present must not be used for 30 minutes by any of the BSs or the terminal units in the wireless communication system 100.

The out-of-channel detector 320 monitors all channels other than the operating channel on a cyclical basis, starting with channels only from set1, and for a minimum duration of 6 minutes for each channel. After checking set1 channels, if the out-of-channel detector 320 monitors set2 channels it checks each set2 channel for a minimum duration of 1 hour.

The base station controller (BSC) 102 receives signals reporting the results of the CACs from all the base stations, including any results from the terminal units. The BSC 102 registers all channels that have been checked for more than the minimum duration (white list) and without any BS detecting a radar signal. The BSC 102 also registers all channels that any BS has detected radar in (black list). The BSC 102 allocates channels only from the white list to the base stations for the operating communication links and also for the channels to be monitored by the out-of-channel detector 320 in this example. In another example of operation of an embodiment of the invention, the BS 104A to 104M select, at least in part autonomously, the channels to be monitored by the out-of-channel detector 320. Detection of radar in any channel in the white list transfers the channel immediately to the black list and the BSC 102 allocates a change to a new channel from the white list to any BS using the incriminated channel. The allocations of channels are registered in the channel allocation memory 314 of each base station, for immediate use without needing to perform the CAC procedure. In one embodiment of the invention, the base stations cease transmitting when radar is detected if no new channel is allocated by the BSC 102 as available or stored in its white list. The regulations also provide for base station operation when not connected to a base station controller, in which circumstances the base stations keep their own white lists and black lists, with updating by communication directly between the different base stations in another embodiment of the invention.

The process 400 of in-channel detection of radar signals starts at 402 with power up of the base station. At 404, the process 400 branches and if the communication system 100 is being tested the system follows the procedure 406 set out in the relevant regulations for testing. When the system is being used in field operation, the process 400 branches again at 408 and is described below if the system is operating according to EU regulations, the process 400 following generally similar procedures 410 with different parameters for other regulations.

Under EU regulations at 412 the base stations (BS) start the channel availability check (CAC) procedure by setting thresholds for minimum levels of detection of radar signals, with the BS transmitters OFF, the thresholds being set by the BSC 102, when the BSs are connected to the BSC, in normal field operation. At 414, the in-channel detectors 318 perform CAC on a channel allocated by the BSC 102 from channel set1, the BSC 102 removing that channel from the list of channels from set1 that can be allocated as the operating channel. The in-channel detectors 318 of the BSs check the channel for radar signals at 416 during 60 secs minimum. At 418, if a radar signal is detected in the channel, the detector sends a report signal to the BSC 102 and the BSC 102 includes the channel at 420 in the black list not to be used for at least 30 minutes by any of the BSs or the terminal units in the wireless communication system 100. At 422 the process branches and if there are any channels left in set1, the BSC 102 allocates another channel to be checked and the process 400 reverts to performing CAC on the new channel at 414. If there are no channels left in set1, the process 400 raises an alert at 424, to bring to the attention of the human operators/support staff of the system that there is an issue, and then checks set2 channels. At 426, the in-channel detectors 318 perform CAC on a channel allocated by the BSC 102 from channel set2, the BSC 102 removing that channel from the list of channels from set2 that can be allocated as the operating channel. The in-channel detectors 318 of the BSs check the channel for radar signals at 428 during 600 secs minimum. At 430, if a radar signal is detected in the channel, the detector sends a report signal to the BSC 102 and the BSC 102 includes the channel at 432 in the black list not to be used for at least 30 minutes by any of the BSs or the terminal units in the wireless communication system 100. At 434 the process branches and if there are any channels left in set2, the BSC 102 allocates another channel to be checked and the process 400 reverts to performing CAC on the new channel at 426. If there are no channels left in set2, the process 400 raises an alert at 436. The process 400 branches at 438: if there are any channels that were on the black list that have completed a duration of 30 mins without further detection of radar signals, they are re-instated in set1 or set2 at 440 and the process 400 reverts to the CAC procedure at 412. If no channels that were on the black list have completed a duration of 30 mins without further detection of radar signals, the base station that has been prevented from transmitting on its operating channel reverts to the CAC procedure at 412 without transmitting until a channel has become available and it has been allocated a channel from the white list.

If at 418 or 430 no radar signal is detected in the channel, the detector sends a report signal to the BSC 102 and the BSC 102 allocates the channel to the base station and linked terminal units as new operating channel and at 442 the base station and linked terminal units tune their transmitters and receivers to the new channel parameters. The reaction of the wireless communication system 100 to switch channels must conform to maximum timings specified in the relevant regulations. At 444, the out-of-channel detector 320 starts monitoring all channels other than the operating channel on a cyclical basis, according to the process 600 described below with reference to FIG. 6. The in-channel detector 318 continues to monitor continuously for radar signal detection at 446 and can monitor for radar signals even in sub-frames during which it transmits itself, during tiles which it is not using. If energy is found at 448 corresponding to a radar signal, the detector sends a report signal to the BSC 102 and the wireless communication system 100 starts the radar avoidance procedure 500 illustrated in FIG. 5.

The radar avoidance procedure 500 starts by the base stations and the BSC 102 including the channel at 502 in the black list not to be used for at least 30 minutes by any of the BSs or the terminal units in the wireless communication system 100. This is performed by the BSC 102 if at 504 the connections of the base stations to the BSC 102 are established. However certain regulations allow field operation, and even specify test procedures, with the base stations disconnected from the BSC. If at 504 the base stations are connected to the BSC 102, and if at 506 a backup channel is available on the white list, the BSC 102 chooses at 508 a channel to allocate to the base station at 510. If at 506 no backup channel is available on the white list, the base station that has been prevented from transmitting on its operating channel reverts to the CAC procedure at 412 (FIG. 4) without transmitting until a channel has become available.

If at 504 the base stations are not connected to the BSC 102, the procedure relies on white and black lists registered in the base stations themselves on detection by themselves or by linked terminal units or by other base stations through connections directly between the base stations. If at 512 the out-of-channel detectors 320 have identified no backup channel available, or if at 514 a backup channel would be available but is still on 30 min. timeout, the base station that has been prevented from transmitting on its operating channel reverts to the CAC procedure at 412 without transmitting until a channel has become available. If a channel is allocated to the base station at 510, the base station signals to the linked terminal units to change channel and then stops its transmission. Now that the BS has moved to a new channel, the terminal units will not transmit until they have re-tuned their receivers and successfully decoded broadcast traffic from the BS, sometimes referred to as listen before speak. At 516 the base station checks whether the linked terminal units have reconnected to the new channel within less than 10 secs. If at 516 one or more linked terminal units have not reconnected to the new channel within less than 10 secs, an alert is raised at 520. The alert is raised to ease operation of the system and to make the operations staff aware of an issue. Now that the BS has moved to a new channel, the terminal units will not transmit until they have re-tuned their receivers and successfully decoded broadcast traffic from the BS, sometimes referred to as listen before speak.

The procedure 600 of out-of-channel detection of radar signals starts at 602 with the BSC 102 (if connected, otherwise the base station itself chooses a white list channel) allocating a channel from set1 that is different from the operating channel of that base station, is not already on the white list and is not subject to 30 min. timeout. If at 604 no channel from set1 with these criteria exists, a channel from set2 is allocated at 606. The radar receiver 312 and out-of-channel detector 320 are tuned to the allocated channel at 608 and start detection and analysis. All the receiver sub-frames in the allocated channel are scanned at 610 for radar signals (or interference), since no data is being transmitted in this channel. If energy is found at 612, the detector sends a report signal to the BSC 102 and the BSC 102 includes the channel at 614 in the black list not to be used for at least 30 minutes by any of the BSs or the terminal units in the wireless communication system 100 and the procedure 600 reverts to 602 with the BSC 102 allocating a channel. If at 616 the channel monitored by the out-of-channel detector 320 is from set1, and if the channel has been monitored for 6 mins, the detector 320 sends a report signal to the BSC 102 and the BSC 102 includes the channel at 620 in the white list. If at 622 the channel monitored by the out-of-channel detector 320 is from set2, and if the channel has been monitored for 1 hour, the detector 320 sends a report signal to the BSC 102 and the BSC 102 includes the channel at 620 in the white list. Otherwise, the detector 320 continues monitoring the channel at 610.

The procedures are described above with reference to detection of radar signals. These examples of embodiments of the invention also react to detection of other extraneous signals, instead of or in addition to radar signals. The reaction depends on the type of signal detected.

The detectors 318 and 320 of the base station 300, and the detectors of the terminal units 106A to 106N analyse signals from the communication modules in unassigned tiles of the communication links. The detectors discriminate between a first type of extraneous signals detected in an unassigned tile or group of unassigned tiles of one sub-frame and also detected in other unassigned tiles or groups of unassigned tiles, and a second type of extraneous signals detected in the unassigned tile or group of unassigned tiles of one sub-frame but not detected in other unassigned tiles or groups of unassigned tiles. The characteristics triggering detection of the second type of extraneous signals can be chosen as to be statistically more likely to be radar (or other extraneous signals having the same burst signal characteristics) and the characteristics triggering detection of first type of extraneous signals to be statistically more likely to be from a source that is not radar.

Figure 7:
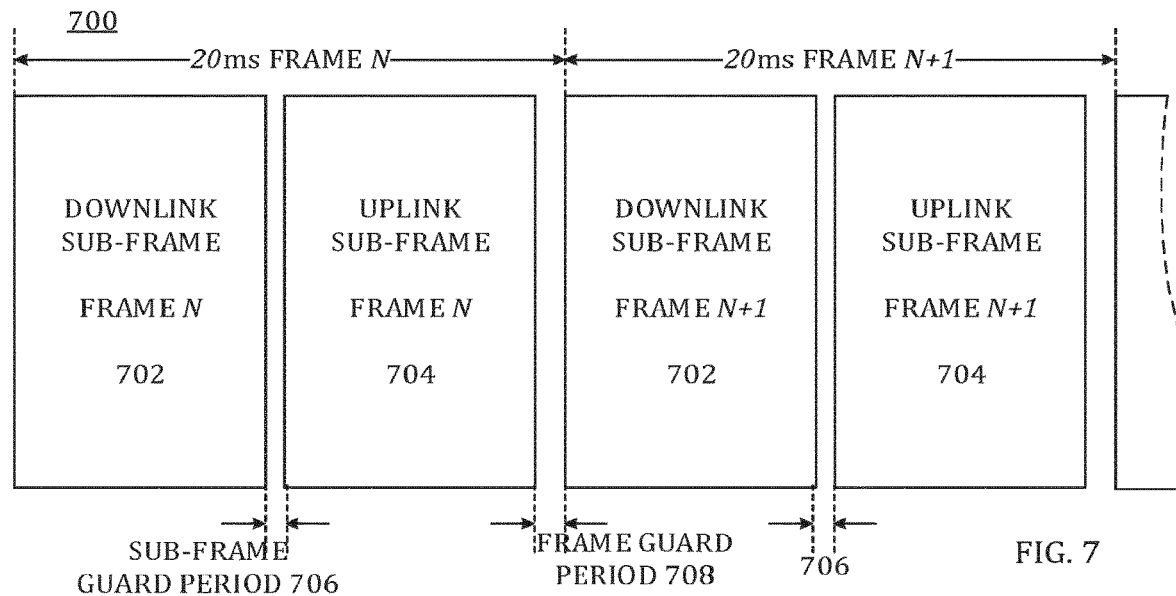
FIG. 7 is a diagram illustrating an example of the structure of frames and sub-frames in data communication signals used in some embodiments of the invention.
Figure 8:
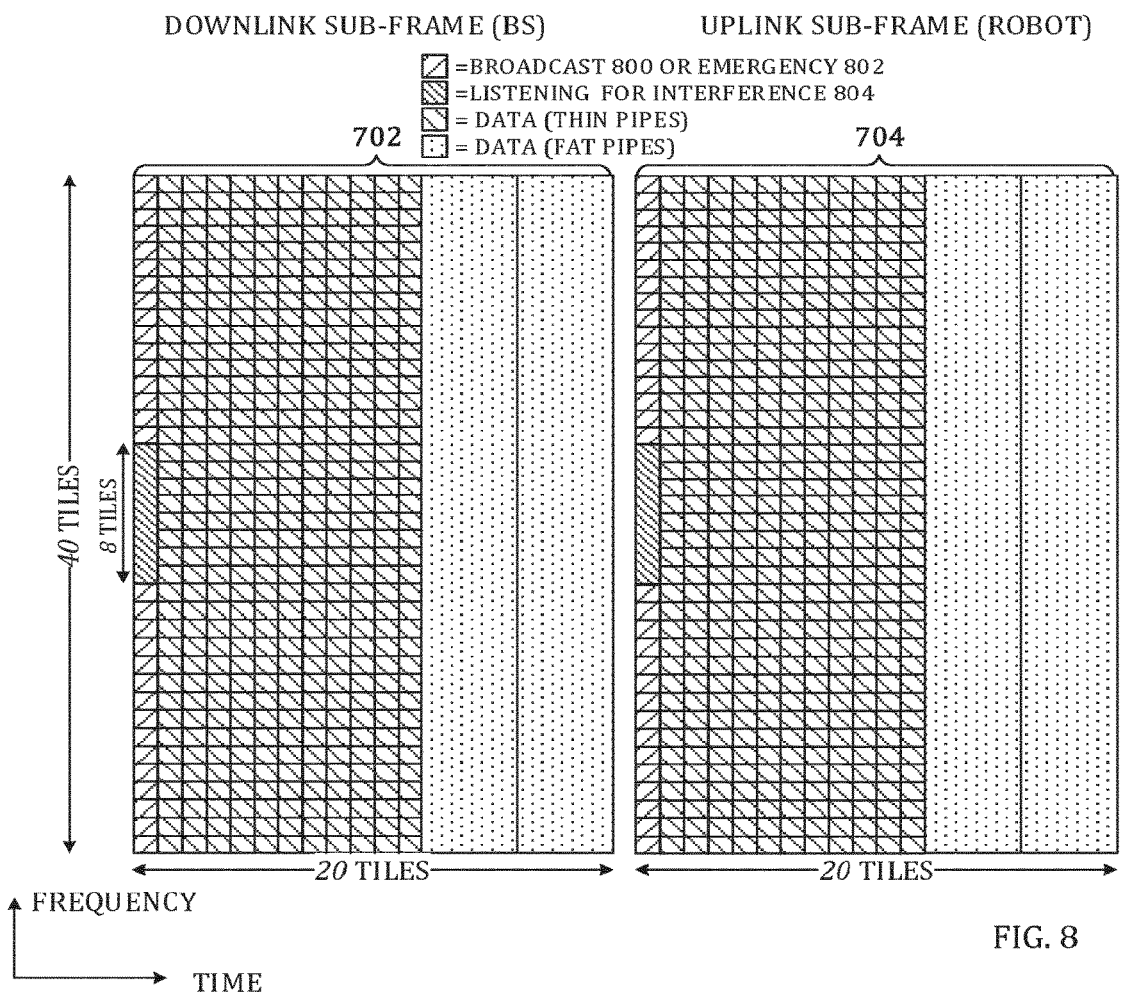
FIG. 8 is a diagram illustrating in more detail an example of the structure of frames and sub-frames in data communication signals used in some embodiments of the invention.

FIGS. 7 and 8 illustrate an example of structure 700 of communication signals used in the system 100. As described in our patent specification GB 2 529 029, this structure 700 uses time division duplex (TDD) where each multi-frame has downlink and uplink sub-frames 702 and 704. The modulation scheme uses orthogonal frequency division multiplex (OFDM) for the downlink and orthogonal frequency division multiple access (OFDMA) for the uplink, with quadrature phase shift keying (QPSK) on sub-carriers. In this example, each sub-frame 702 and 704 has OFDM symbols in the time domain mapped onto a set of subcarriers in the frequency domain by passing the symbol through an inverse fast Fourier transform (iFFT). The OFDM pilot symbols and data symbols are grouped into tiles where a tile is the smallest unit of a sub-frame which can be occupied or not occupied.

In the example illustrated, the frequency band is 5 470 MHz to 5 725 MHz, with the centre frequencies of the sub-carriers set to (5 477.5+N*10) MHz, where N is the number of the sub-carrier from 0 to 24. The period of each frame is 20 ms split equally into downlink and uplink sub-frames 702 and 704, with guard periods 706 and 708 of approximately 10 µs.

FIG. 8 illustrates in more detail the structure of this example of sub-frames. Each sub-frame is 20 tiles 'wide' in time and 40 tiles 'high' in frequency, with equal numbers of tiles above and below the DC sub-carrier in frequency. The data communication tiles are grouped into bursts, referred to as pipes, which can be one of several different types depending on the type of data contained in them. The exact layout of the sub-frame can be configured by changing the number of thin and fat pipes. Bursts may span several tiles in the case of fat pipes, or individual tiles or pairs of tiles in the case of thin pipes. FIG. 8 shows the structure of a frame when the downlink and uplink sub-frames 702 and 704 have each been configured to support 2 fat pipes, and up to 440 thin pipes. Each thin pipe contains data to or from one specific terminal unit. Fat pipes provide a higher data throughput than thin pipes and are allocated to individual terminal units dynamically as required. The first time slot 800 of each downlink sub-frame and the first time slot 802 of each uplink sub-frame, except the eight centre frequency tiles 804, are reserved for broadcast information for all terminal units (downlink) and emergency (uplink—a contention based mechanism for a terminal to communicate with the base station when it fails to communicate via a thin pipe), which are robustly encoded to be less susceptible to interference.

The detectors such as 318 and 320 in the base stations 104A to 104M and 300 and in the terminal units 106A to 106N analyse received signals in a group of unassigned tiles of the first time slot 800 and 802 of the sub-frames 702 and 704, in this example the eight centre frequency tiles 804, and in the same group 804 of unassigned tiles of subsequent similar (downlink or uplink) sub-frames 702 or 704 and/or in other unassigned tiles of the same sub-frame and subsequent sub-frames. In this example, if extraneous signals are detected in four multi-frames or less within three continuous seconds, the base stations or terminal units will resume normal operation when the interference is no longer detected, although another number may be used. In this example, if extraneous signals are detected three times in more than four multi-frames, or continuously, within three continuous seconds, the base stations change channel and signal that to the linked terminal units. Reception of the first type of extraneous received signals is detected if the detectors detect reception of extraneous signals in the same groups of unassigned tiles, for example the centre tiles of the first time slot, of subsequent similar sub-frames. The detectors discriminate between the first type of extraneous signals detected in the unassigned tile or group of unassigned tiles of one sub-frame and also detected in the same unassigned tile or group of unassigned tiles of another sub-frame, and the second type of extraneous signals detected in unassigned tiles of one sub-frame but not detected in unassigned tiles of the other sub-frame.

The detection of extraneous signals as radar is statistical. Radar signals can be encountered with different pulse widths and different pulse repetition frequencies within a burst. The ETSI and FCC regulations define test signals that are considered to be representative of typical radar signals. The ETSI document EN301893, BRAN, table D.4 prescribes the following characteristics of test signals:

| Radar test signal N° | Pulse width (µs) | | Pulse repetition frequency (PRF in pps) | | Number of pulses per burst |
|---|---|---|---|---|---|
| | Minimum | Maximum | Minimum | Maximum | |
| 1 | 0.5 | 5 | 200 | 1 000 | 10 |
| 2 | 0.5 | 15 | 200 | 1 600 | 15 |
| 3 | 0.5 | 15 | 2 300 | 4 000 | 25 |
| 4 | 20 | 30 | 2 000 | 4 000 | 20 |
| 5 | 0.5 | 2 | 300 | 400 | 10 |
| 6 | 0.5 | 2 | 400 | 1 200 | 15 |

For radar signals, the probability of detection depends on pulse width and repetition frequency. For example, for a radar signal resembling the test signal n° 3, the minimum PRF is 200 Hz and there are 10 pulses in a burst, the maximum PRF is 1 000 Hz so the burst length can vary from 45 ms to 9 ms. The base stations 104A to 104M have a tile width (slot width) of 0.5 ms and a frame width of 20 ms. The probability of a radar pulse landing in a particular time slot is $2.5*10^{-2}$. The probability of a second radar pulse landing in the same slot one frame later depends on the PRF and the burst length. For example, given the range of PRFs and assuming the longest pulse width of 15 µs the probabilities of these radar pulses being received in the first receive time slots of successive frames are:
Probability of a radar pulse being received in first time slot of 1 frame=$2.5*10^{-2}$;
Probability of radar pulses being received in first time slot of 2 frames=$1.7*10^{-3}$;
Probability of radar pulses being received in first time slot of 3 frames=$1.8*10^{-4}$;
Probability of radar pulses being received in first time slot of 4 frames≈0.

For a radar signal resembling the test signal n° 4, the minimum PRF is 200 Hz and there are 15 pulses in a burst, the maximum PRF is 1 600 Hz so the burst length can vary from 70 ms to 8.75 ms. Assuming the longest pulse width of 15 µs the probabilities of these radar pulses being received in the first receive time slots of successive frames are:
Probability of a radar pulse being received in first time slot of 1 frame=$2.5*10^{-2}$;
Probability of radar pulses being received in first time slot of 2 frames=$2.4*10^{-3}$;
Probability of radar pulses being received in first time slot of 3 frames=$4.6*10^{-4}$;
Probability of radar pulses being received in first time slot of 4 frames=$1*10^{-4}$.

The reactions of the system 100, of the base stations 104A to 104M and 300 and of the terminal units 106A to 106N to detection of the first type of extraneous signals are different from their reactions to detection of the second type of extraneous signals. In this example, when the second type of extraneous signals is detected, and interpreted as radar, a base station 104A to 104M and 300 avoids or ceases transmitting on that channel, apart from brief control signalling, can change channel in accordance with the procedure 400, 500 described above, and instructs its linked terminal units 106A to 106N to avoid or cease transmitting on that channel and/or change channel. When the first type of extraneous signals is detected in a reception sub-frame, and interpreted as not radar, a base station 104A to 104M and 300 and a terminal unit 106A to 106N individually avoids transmitting data on that channel in the subsequent transmission sub-frame, unless and until the interference of the extraneous signals is no longer detected. If it is the base station that detects the first type of extraneous signals it will send a Radio Resource Control (RRC) message in the broadcast tiles in the first time slot of the subsequent transmission sub-frame instructing its linked terminal units 106A to 106N to not transmit, or to change channel (frequency) after a specified number of frames, and then cease transmission or change channel (frequency) itself. If it is a terminal unit 106A to 106N that detects the first type of extraneous signals, it will queue a low priority uplink message to flag this to its linked base station at the first opportunity using a normal priority uplink thin pipe. If the flag is corrupted by the interferer it is attempting to report to the linked base station, the base station may not receive the flag, however, and can react only to the absence of uplink messages from the linked terminal unit. In this example, the reaction of the system 100 to detection of the first type of extraneous signals uses Adaptivity techniques compliant with the test procedures from ETSI set out in the document EN 300 440-1 V1.5.1 (2009-03) "Electromagnetic compatibility and Radio spectrum Matters (ERM); Short range devices".

The reactions of the system 100 to detection of extraneous signals is summarised below for some examples of scenarios involving radar and other interference or noise with an example of a system 100.

| Reception | Base station Interpretation | System reaction |
|---|---|---|
| Extraneous signals in 6 centre tiles of $1^{st}$ slot of a single sub-frame | $2^{nd}$ type (radar) | DFS: BS avoids Tx data, but signals to terminals not to Tx data. Initiates channel change (with BS controller) |
| Extraneous signals in 6 centre tiles of 1st slot of a single sub-frame & other slots of same sub-frame | $2^{nd}$ or $1^{st}$ type (radar or other). Could be either radar or other extraneous signals | Adaptivity (initially): BS avoids transmitting data on next sub-frame, but signals to terminals not to transmit data. BS analyses subsequent sub-frames: if extraneous signals present in next sub-frames, detect other interference & Adaptivity reaction; if no extraneous signals in (some) next sub-frames, detect radar & DFS reaction (channel change) |
| Extraneous signals in 6 centre tiles of 1st slot of 2 or more sub-frames <400 ms & in other tiles | Most probably other extraneous signals, but the radar DFS reaction will probably have been triggered, Small probability that actually radar. | Adaptivity: BS avoids transmitting data on next sub-frame. BS reports to BS controller, but BS & terminals resume normal communication on same channel when no more extraneous signals |
| Extraneous signals in 6 centre tiles of 1st slot of sub-frames >400 ms but <3 sec & detected in other tiles | Most probably other extraneous signals, but the radar DFS reaction will have been triggered. Small probability that actually radar. | Adaptivity: BS avoids transmitting data on next sub-frame. BS reports to BS controller, but BS & terminals resume normal communication. Terminals will have disconnected & started a channel search after 400 ms, restarting on the current channel |
| Extraneous signals in 6 centre tiles of 1st slot of sub-frames >3 sec & detected in other tiles | Most probably other extraneous signals, but the radar DFS reaction will have been triggered probably. Very small probability that actually radar. | Adaptivity: BS avoids transmitting on next sub-frame & until no more extraneous signals. BS reports to BS controller. BS changes channel >3 secs. Terminals have lost communication, search new channel after 400 ms. Previous channel placed at bottom of white list, not on black list |

Brief control signalling messages are transmissible under both the DFS and Adaptivity reactions even when data transmissions are blocked in the transmission sub-frame. The base stations 104A to 104M and 300 react to detection of extraneous signals by the linked terminal units 106A to 106N, to their own detection of extraneous signals, and to detection of extraneous signals by other base stations and base station controllers with which they are connected.

The invention may be implemented at least partially in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one, or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. The mere fact that certain measures are recited in mutually different claims does not indicate that a combination of these measures cannot be used to advantage.

The invention claimed is:

1. A wireless communication system comprising:
   at least one base station;
   a plurality of remotely located terminal units;
   communication modules for transmitting and receiving data over operational wireless communication links between the at least one the base station and the terminal units, the wireless communication links being assigned to respective sub-channels having tiles separated by frequency and time, wherein the at least one base station and/or at least one terminal unit includes at least one detector for analysing signals from the communication modules for detecting extraneous received signals;
   the at least one detector being configured to analyse signals from the communication modules in a plurality of tiles of the operational wireless communication links;
   the at least one detector being configured to discriminate between a first type of extraneous signals detected in a tile or group of tiles of one sub-frame and also detected in other tiles or groups of tiles, and a second type of extraneous signals detected in the tile or group of tiles of one sub-frame but not detected in other tiles or groups of tiles; and
   the at least one base station (LBT, DAA, Adaptivity) being configured to react to detection of the first type of extraneous signals differently than a reaction of the at least one base station (DFS) to detection of the second type of extraneous signals.

2. A wireless communication system according to claim 1, wherein reaction of the at least one base station (LBT, DAA, Adaptivity) to detection of the first type of extraneous signals is to avoid or cease transmitting on that sub-channel unless the extraneous signals are no longer detected.

3. A wireless communication system according to claim 2, wherein reaction of the at least one base station to detection of the first type of extraneous signals uses Adaptivity techniques for the operational wireless communication links.

4. A wireless communication system according to claim 1, wherein reaction of the at least one base station (DFS) to detection of the second type of extraneous signals is to change channel parameters for the operational wireless communication links.

5. A wireless communication system according to claim 4, wherein reaction of the at least one base station to detection of the second type of extraneous signals uses dynamic frequency selection techniques to change channel parameters for the operational wireless communication links.

6. A wireless communication system according to claim 1, wherein the operational wireless communication links are separated into uplink and downlink sub-frames comprising:
   successive time slots, and the at least one detector analyses signals from the communication modules in a group of tiles of a first time slot of the sub-frames, and reception of the first type of extraneous received signals is detected when the at least one detector detects reception of extraneous signals in a same group of tiles of subsequent similar sub-frames.

7. A wireless communication system according to claim 1, wherein reception of the second type of extraneous received signals is detected when the at least one detector detects reception of extraneous signals in one or some of the tiles but not in other tiles of the same sub-frame.

8. A wireless communication system according to claim 1, wherein the at least one detector is configured to discriminate between the first type of extraneous signals detected in the tile or group of tiles of one sub-frame and also detected in the same tile or group of tiles of another sub-frame, and the second type of extraneous signals detected in tiles of one sub-frame but not detected in tiles of the other sub-frame.

9. A wireless communication system according to claim 1, wherein reception of the second type of extraneous received signals is detected when the at least one detector detects reception of extraneous signals in one or some of the tiles of one sub-frame and in other tiles of the same sub-frame, but not in tiles of a subsequent sub-frame.

10. A wireless communication system according to claim 1, wherein the at least one detector is configured to detect reception of radar signals as the second type of extraneous received signals.

11. A wireless communication system according to claim 1, wherein the at least one base station as master unit is configured to control channel parameters for the operational wireless communication links with linked terminal units as slave units.

12. A base station for a wireless communications system, wherein the system comprises:
the base station; and
a plurality of remotely located terminal units;
communication modules for transmitting and receiving data over operational wireless communication links between the base station and the terminal units;
wherein the base station includes at least one detector for analysing signals from the wireless communication module of the base station for detecting extraneous received signals;
the at least one detector of the base station being configured to analyze signals from the communication module in tiles of the wireless communication links;
the at least one detector being configured to discriminate between a first type of extraneous signals detected in a tile or group of tiles of one sub-frame and also detected in other tiles or groups of tiles, and a second type of extraneous signals detected in the tile or group of tiles of one sub-frame but not detected in other tiles or groups of tiles; and
the base station (LBT, DAA, Adaptivity) being configured to react to detection of the first type of extraneous signals differently than a reaction of the base station (DFS) to detection of the second type of extraneous signals.

13. A base station according to claim 12, wherein reaction of the base station (LBT, DAA, Adaptivity) to detection of the first type of extraneous signals is to avoid or cease transmitting on that sub-channel unless the extraneous signals are no longer detected.

14. A base station according to claim 13, wherein reaction of the base station to detection of the first type of extraneous signals uses Adaptivity techniques for the operational wireless communication links.

15. A base station according to claim 12, wherein reaction of the base station (DFS) to detection of the second type of extraneous signals is to change channel parameters for the operational wireless communication links.

16. A base station according to claim 15, wherein reaction of the base station to detection of the second type of extraneous signals uses dynamic frequency selection techniques to change channel parameters for the operational wireless communication links.

17. A base station according to claim 12, wherein the operational wireless communication links are separated into uplink and downlink sub-frames comprising:
successive time slots, and the at least one detector analyses signals from the communication module in a group of tiles of a first time slot of the sub-frames, and reception of the first type of extraneous received signals is detected when the at least one detector detects reception of extraneous signals in a same group of tiles of subsequent similar sub-frames.

18. A base station according to claim 12, wherein reception of the second type of extraneous received signals is detected when the at least one detector detects reception of extraneous signals in one or some of the tiles but not in other tiles of the same sub-frame.

19. A base station according to claim 12, wherein the at least one detector is configured to discriminate between the first type of extraneous signals detected in the tile or group of tiles of one sub-frame and also detected in the same tile or group of tiles of another sub-frame, and the second type of extraneous signals detected in tiles of one sub-frame but not detected in tiles of the other sub-frame.

20. A base station according to claim 12, wherein reception of the second type of extraneous received signals is detected when the at least one detector detects reception of extraneous signals in one or some of the tiles of one sub-frame and in other tiles of the same sub-frame, but not in tiles of a subsequent sub-frame.

21. A base station according to claim 12, wherein the at least one detector is configured to detect reception of radar signals as the second type of extraneous received signals.

22. A base station according to claim 12, wherein the base station as master unit is configured to control the channel parameters for the operational wireless communication links with linked terminal units as slave units.

23. A method of wireless communication in a wireless communication system having at least one base station; and a plurality of remotely located terminal units;
the at least one base station and the remotely located terminal units having respective communication modules for transmitting and receiving data over operational wireless communication links between the at least one base station and the remotely located terminal units; wherein the operational wireless communication links are assigned to respective sub-channels having tiles separated by frequency and time; and wherein the at least one base station and/or at least one of the remotely located terminal units includes at least one detector analysing signals from the communication modules for detecting extraneous received signals, the method comprising:
analysing, via the at least one detector, signals from the wireless communication modules in a plurality of tiles of the operational wireless communication links;
discriminating, via the at least one detector, between a first type of extraneous signals detected in a tile or group of tiles of one sub-frame and also detected in other tiles or groups of tiles, and a second type of extraneous signals detected in the tile or group of tiles of one sub-frame but not detected in other tiles or groups of tiles; and reacting, via the at least one base station (LBT, DAA, Adaptivity), to detection of the first type of extraneous signals differently from a reaction of the at least one base station (DFS) to detection of the second type of extraneous signals.

24. A method of wireless communication according to claim 23, wherein reaction of the at least one base station (LBT, DAA, Adaptivity) to detection of the first type of extraneous signals comprising:

avoiding or ceasing transmitting on that sub-channel unless the extraneous signals are no longer detected.

25. A method of wireless communication according to claim 24, wherein reaction of the at least one base station to detection of the first type of extraneous signals comprises:

Adaptivity techniques for the operational wireless communication links.

26. A method of wireless communication according to claim 23, wherein reaction of the at least one base station (DFS) to detection of the second type of extraneous signals comprises:

changing channel parameters for the operational wireless communication links.

27. A method of wireless communication according to claim 26, wherein reaction of the at least one base station to detection of the second type of extraneous signals comprises:

using dynamic frequency selection techniques to change channel parameters for the operational wireless communication links.

28. A method of wireless communication according to claim 23, comprising:

separating the operational wireless communication links into uplink and downlink sub-frames having successive time slots;

analyzing, via the at least one detector, signals from the communication modules in a group of tiles of the first time slot of the sub-frames; and detecting reception of the first type of extraneous received signals when the at least one detector detects reception of extraneous signals in the same group of tiles of subsequent similar sub-frames.

29. A method of wireless communication according to claim 23, comprising:

detecting reception of the second type of extraneous received signals when the at least one detector detects reception of extraneous signals in one or some of the tiles but not in other tiles of the same sub-frame.

30. A method of wireless communication according to claim 23, comprising:

discriminating, via the at least one detector, between the first type of extraneous signals detected in the tile or group of tiles of one sub-frame and also detected in the same tile or group of tiles of another sub-frame, and the second type of extraneous signals detected in tiles of one sub-frame but not detected in tiles of the other sub-frame.

31. A method of wireless communication according to claim 23, comprising:

detecting reception of the second type of extraneous received signals when the at least one detector detects reception of extraneous signals in one or some of the tiles of one sub-frame and in other tiles of the same sub-frame, but not in tiles of a subsequent sub-frame.

32. A method of wireless communication according to claim 23, comprising:

detecting, via the at least one detector, reception of radar signals as the second type of extraneous received signals.

33. A method of wireless communication according to claim 23, comprising:

controlling, via the at least one base station as master unit, the channel parameters for the operational wireless communication links with linked terminal units as slave units.

* * * * *